June 25, 1963  R. F. POST  3,094,968
EXPENDABLE VAPOR NOISEMAKER
Filed Jan. 25, 1945  2 Sheets-Sheet 1

Inventor
RICHARD F. POST.
By
Attorney

June 25, 1963 R. F. POST 3,094,968
EXPENDABLE VAPOR NOISEMAKER
Filed Jan. 25, 1945 2 Sheets-Sheet 2
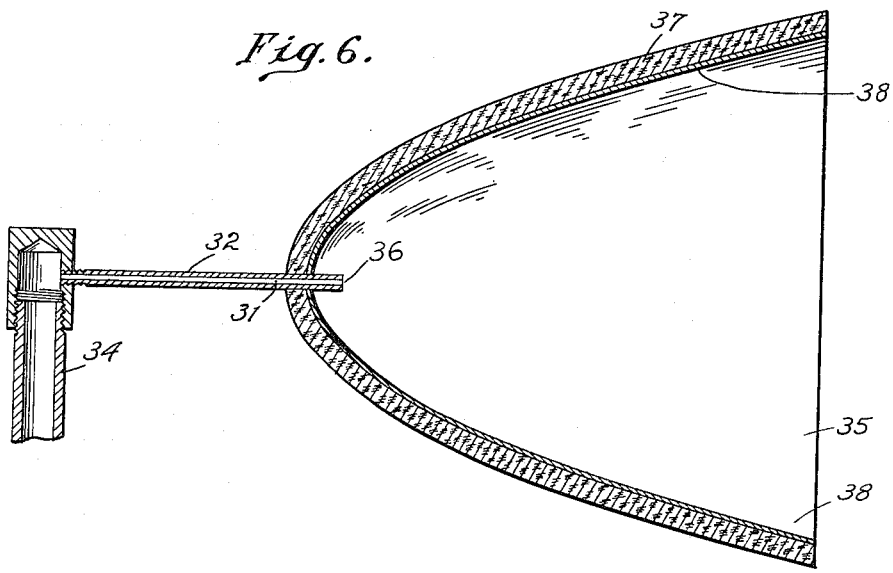
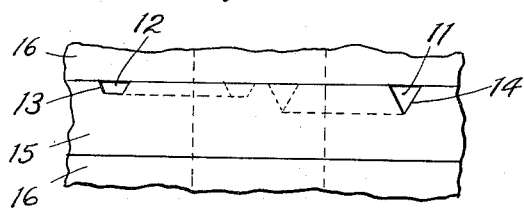 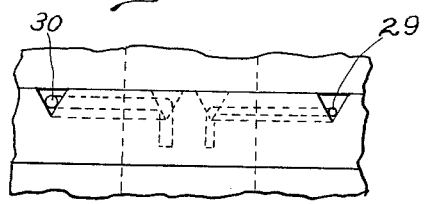
Inventor
RICHARD F. POST.

3,094,968
EXPENDABLE VAPOR NOISEMAKER
Richard F. Post, Alexandria, Va.
(% Naval Research Laboratory, Washington, D.C.)
Filed Jan. 25, 1945, Ser. No. 574,602
7 Claims. (Cl. 116—27)
(Granted under Title 35, U.S. Code (1952), sec. 266)

The present invention relates in general to sound producing devices and in particular to underwater sound generating devices of the expendable type.

An object of the invention is the provision of means for producing sound by collapse of vapor bubbles injected into water and in a manner effective to produce underwater noises of a quality and intensity amply sufficient for utilization as a counter measure against acoustic torpedoes and sonic direction finders, or as a sonic beacon or the like.

Another object is the provision of a sound generator of the above type operating to produce a substantially wide band of frequencies, including high audible and superaudible frequency and having a frequency spectrum not strongly peaked, but which may be peaked if desired.

A further object is the provision of a sound generator of the above type capable of combination with a suitable portable source of actuating fluid for use as an expendable free floating underwater sound generator.

A further object is the provision of a relatively cheap, sturdy, and reliable sound generating device capable of rough handling without mechanical injury or detriment to its operating quality.

Various other objects and advantages of the invention will become apparent from a perusal of the following specification and the drawings accompanying same.

In the drawings:

FIGURE 4 is an enlarged fragmentary view showing the diversification of orifice contour.

FIGURE 5 is a similar enlarged fragmentary view showing a modified arrangement of diversification of the physical characteristics of channel and orifice.

FIGURE 6 is a cross sectional view of a modification applying the principles of the invention to a beam projector.

Figure 1:
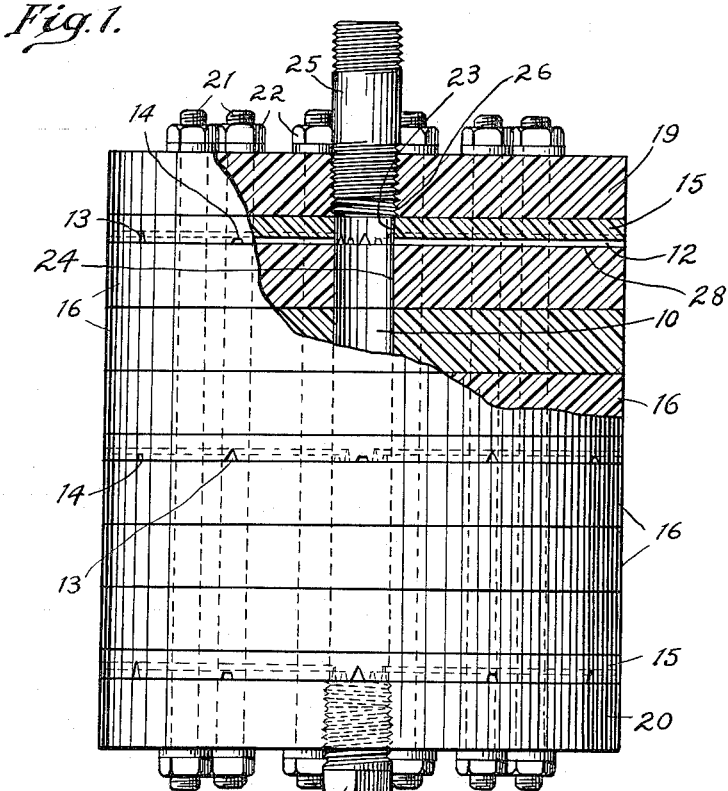
FIGURE 1 is a side elevation of the sound generator separate from the source of operating fluid.
Figure 2:
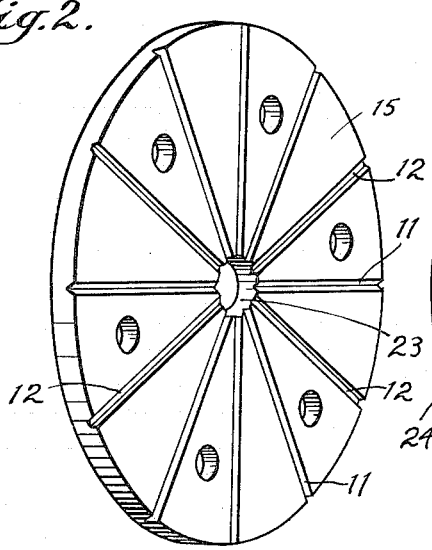
FIGURE 2 is a perspective view of one of the channel disks.
Figure 3:
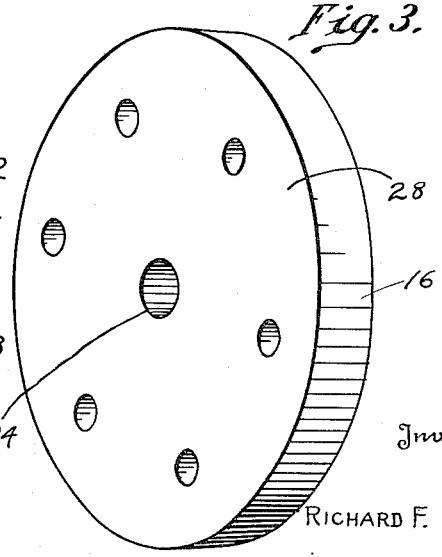
FIGURE 3 is a similar perspective view of one of the separating or spacing disks.

Inasmuch as the present invention is directed to a noise generating device operable from any known or other suitable source of water condensible vapor under pressure, a specific disclosure of such a source is deemed unnecessary to a complete understanding of the invention and accordingly is omitted.

The term water condensible gaseous substance is intended to indicate a gaseous substance capable of such condensation when injected in the form of small discrete portions into water, due to either extraction of heat by the water, solution of the substance in the water or both. Among such substances are ammonia gas, hydrochloric acid gas, and steam. In the case of steam the sudden collapse of the bubble is obviously due to condensation while in the use of ammonia and hydrochloric acid gas the collapse is substantially wholly due to solution of the gas in the water.

Referring to the drawings in detail, and first to FIGURES 1 to 5 these show a preferred embodiment for producing a sound output over the widest practical range of frequencies with minimum expenditure of power or driving material particularly with the use of ammonia vapor as the driving material. The device comprises in general a manifold chamber 10 with a plurality of radial distributor channels 11 and 12 leading from the manifold chamber to points of discharge spaced apart over a substantially uniform surface, in the present instance a cylindrical surface, a distance of not substantially less than one and one-quarter inches. The distributing channels 11 and 12 are alike except for a difference in their cross sectional area and contour. The cross sectional area of the channels 12 being slightly less than that of the channels 11. In the present case both are in the neighborhood of one one-thousandth of a square inch. All the channels are approximately 2¼ inches in length and have their surfaces roughened. This roughness of the surfaces and the given length together with the restricted cross sectional area when used with ammonia gas at a frequency of approximately 24 kc., forms a channel element having an acoustical impedance in the order of the radiation resistance of the surrounding water. This impedance, radiation-resistance matching for other gases and frequencies may be obtained by following the known formula for acoustic impedance of a tube. Such matching especially applies to applicant's device in that it prevents release of sound pressure back into the manifold chamber, with consequent improvement of sound production. In the present instance using ammonia gas at a pressure of 30 to 100 pounds per square inch and with the jet elements spaced not substantially less than ¾ of an inch, the sound output was found to be adequate at frequencies not substantially below 24 kc. Because of their difference in cross sectional contour the radial distributing channels 11 and 12 form at their discharge ends orifices 13 and 14 respectively of diversified cross sectional contours. In the present instance that of the channels 11 is an equilateral triangle while that of the channels 12 is a trapezoid, formed by omitting a portion of the apex of the triangle. The use of orifices of non-circular contour such as a triangle or a trapezoid has been found to result in avoidance of undue predominance of particular frequencies in the band produced even by a single jet. No particular theory is advanced as to how this effect is produced. It appears that as against a smooth cylindrical stream, a non-cylindrical stream is more unstable in its resistance to being broken up into discreet portions or bubbles whereby the breaks are more random in occurrence and the resulting separated portions or bubbles more irregular in volume.

The device is built up of a series of centrally apertured disks comprised of a plurality of channel disks 15, spacing disks 16, and a pair of end disks 19 and 20 stacked one upon the other in the order shown in FIGURE 1 and bound together by the clamping bolts 21 and nuts 22. Thus the apertures in the various disks such as the apertures 23 and 24 are thrown into line to form the central manifold chamber 10, while the channels 11 and 12 in the channel disks 15 are closed by the contacting adjacent surfaces of the adjacent spacing disks.

Driving fluid is supplied to the manifold chamber 10 through a fluid supply pipe 25 threaded into the central aperture 26 of the upper end disk 19. The lower end disk 20 also has its central aperture threaded to receive a threaded stop plug 27. By having the pipe 25 and plug 27 of the same external diameter and thread-gage, the several kinds of disks, channel disks, spacing disks and end disks are interchangeable with other of their kind which makes for convenience in building up devices of various lengths and with different spacing of the channel disks. In the present embodiment the spacing disks and end disks are of approximately five-eights of an inch in thickness while the channel disks are approximately one-fourth of an inch thick.

It will be obvious that instead of the three separate spacing disks 16, between adjacent channel disks 15, a single spacing disk of the required thickness may be used.

The diversity of frequencies or wavelengths produced by the different jets operating simultaneously makes for the production of a white spectrum. The term white spectrum as here used being understood to indicate a band of frequencies in which substantially all the frequencies within the band are present in substantially the same general magnitude of intensity.

In the present embodiment the inner surfaces of the channels 11 and 12 are roughened by sandblasting the entire channeled side of the channel disks. Those surfaces of the spacing disks which lie against the channeled surfaces of the channel disks such as the surface 28 of the uppermost spacing disk 16 (FIGURE 1) being similarly roughened.

In the present embodiment the various disks are formed of a synthetic resin, the channel disks being formed of polystyrene while the spacing disks are formed of a suitable phenol condensation product. These materials have been found satisfactory for use under water and with ammonia vapor as a driving medium. However, it will be understood that various other materials including metals may be used provided they are not detrimentally affected by the particular driving fluids used.

An alternative method of obtaining diversity of effective cross sectional area of the channels and their outlet orifices is to make the channels identical and place wires of different diameters, in different channels as indicated in FIGURE 5 where such wires are indicated at 29 and 30. The wires being held in place by having a short length bent at right angle within the manifold chamber. This has the advantage of rendering identical or stock devices adjustable at will to produce the diversification between the predominant frequencies of different jets necessary to the production of an approximately white spectrum, or on the other hand to peak a certain frequency or frequencies in the aggregate band or spectrum, as may be desired. Two sizes of channels usually give sufficient mixing for the production of an approximately white spectrum. The use of twine instead of wire for varying the cross sectional area and surface texture of the fluid conducting path within the channel was found to give a high acoustic output.

It has been found that within the wide limits above mentioned, the length of the channels and spacing of the outlets of the jets or orifices are critical. The channel lengths are approximately two and one-quarter inches for a range of channel sizes of the order of one one-thousandth to one-fiftieth of a square inch in area which with the roughening of the wall, provides sufficient impedance, relative to the radiation resistance of sound in the surrounding water, to permit reasonable sufficiency of sound generation by preventing sound pressure-release back into the manifold chamber. The output of the manifold jet elements are found to be adequate so long as their separation is not substantially less than three-quarters of an inch for frequencies not substantially above 24 kilocycles. Separations considerably beyond this, say up to one and one-half inches have been found to result in but slight increase in acoustic output.

Operating pressures with ammonia gas ranging from 30 to 100 pounds per square inch have given satisfactory results.

While in the present embodiment the manifold chamber and the radially extending distributing channels are formed by means of a stack of suitably formed disk members for the sake of convenience, it will be obvious that any known or other suitable means may be employed for forming such elements without variation in function.

Another embodiment of the invention adapted to the production of a sound beam under water is shown in FIGURE 6. Here a single jet or channel 31 is provided by the tube 32 extending from a supply pipe 34 to within an under-water reflector 35 where the other end of the tube 32 terminates in an orifice 36 at the focal point of the reflector, in the present embodiment a parabolic reflector having a relatively thick wall of cork 37 supported on a thin, spun-aluminum form 38. Instead of cork the reflector may be found of any known or other suitable material having the acoustic qualities necessary to produce an underwater, acoustic reflector. Here as in the other modifications the channel 31 is provided with a roughened inner wall surface and is of a length sufficient to produce in a column of a gaseous fluid occupying the space within the channel, an acoustical impedance of the order of the radiation resistance of the surrounding water. For such substantial matching of acoustic impedance and radiation resistance at a frequency not substantially below 24 k.c., the following values should be used: With ammonia gas at a pressure of 30 to 100 pounds per square inch, the length of the channel 31 should be in the neighborhood of two and one-quarter inches and its cross sectional area should be not substantially less than one one-thousandth or more than one-fiftieth of a square inch. It is also of advantage to have the contour of the channel and consequently that of the orifice non-circular.

While I have herein shown and described certain preferred embodiments of the invention for the sake of disclosure, it is to be understood that the invention is not limited to such embodiments but contemplates all such embodiments but contemplates all such modification and variations thereof as fall fairly within the scope of the appended claims.

The invention described herein may be manufactured and used by or for the Government of the United States of America for governmental purposes without the payment of any royalties thereon or therefor.

What is claimed is:

1. An underwater sound producing device comprising means forming a manifold chamber, means forming a plurality of separate channels leading from the manifold chamber to points of discharge spaced apart at least one-quarter of an inch, a gaseous body filling the space extending from the manifold chamber through the channels, said channels with the particular gaseous body having, for sound waves of substantially 24 kc., an acoustic impedance substantially equal to the radiation resistance of water.

2. An underwater sound producing device comprising means forming a manifold chamber, means forming a plurality of separate channels leading from the manifold chamber to points of discharge spaced apart at least one quarter of an inch, and a gaseous body extending from the manifold through the channels and forming elongated sound transmitting bodies, each of said channels having a cross-sectional area of not over one-fiftieth and not substantially less than one-thousandth of a square inch and a critical length determined by that length required to give to a column of the particular gaseous fluid filling the channel, an acoustic impedance at a frequency of approximately 24 kc., at least substantially matching that of a surrounding body of water.

3. An underwater sound generating device comprising a manifold conduit, a plurality of distributing conduits each having one end in communication with the manifold conduit and the other end open, said open ends having orifices of different areas and shapes of cross-section, and a gaseous body extending from the manifold through said conduits and forming elongated sound transmitting bodies, said distributing conduits having roughened side walls and a critical length determined by that length required to give to a column of the particular gaseous material occupying the space within the conduit an acoustic impedance, at a frequency of approximately 24 kc., at least matching that of a body of water surrounding the said open ends.

4. An underwater sound generator comprising means forming a manifold chamber, means forming a plurality of separate distributing channels leading from the manifold chamber to points of discharge spaced apart at least one-fourth of an inch and not more than one and one-half inch, each of said channels having a length of at least one and not more than four inches and a cross-sectional area of not over one-fiftieth and not less than one one-thousandth of a square inch.

5. An under-water sound generator comprising means forming a manifold chamber, means forming a plurality of separate distributing channels leading from the manifold chamber to points of discharge spaced apart over a substantially uniform surface, said distributing channels having a length of substantially two and one-fourth inches, their discharge ends spaced apart at least one inch and their area of cross-section substantially one one-thousandth of a square inch, the discharge ends of said channels having a non-circular cross-sectional contour, said channels having their walls roughened to produce turbulence in the flow of a gaseous fluid therethrough and increase the acoustic impedance of a column of such gaseous fluid filling the channel.

6. An under-water sound generating device comprising a distributor head built up of a plurality of centrally-apertured, radially channeled disks, and centrally-apertured spacing disks and end closure-disks stacked together in coaxial alignment with the spacing disks interposed between the channeled disks to form a cylindrical prism having a central manifold chamber formed by the central apertures, and a plurality of radial channels extending from the manifold to the outer surface of the cylindrical prism, means holding the disks in assembled position, and means for conducting a gaseous fluid through one, of said end disks into the said manifold chamber, said channel grooves being covered by the adjacent surface of an adjacent spacing disk to form a conduit, the walls of said grooves and the groove-covering face portions of said spacing disks being roughened to form roughened walls for said conduits.

7. An under-water sound generator comprising means forming a manifold chamber, means forming a plurality of distributing channels leading from the manifold chamber to points of discharge spaced apart over a substantially uniform surface a distance of not substantially less than one and one-fourth inches, said channels having a length of substantially two and one-fourth inches and their area of cross-section in the neighborhood of one one-thousandth of a square inch each of said channels being non-circular in cross-section and having their surfaces roughened to produce turbulence in the flow of a gaseous fluid therethrough and increase the acoustic impedance of a column of such gaseous fluid filling the channel.

References Cited in the file of this patent

UNITED STATES PATENTS

| | | |
|---|---|---|
| 1,758,304 | Winkler | May 13, 1930 |
| 1,969,644 | Gavett | Aug. 7, 1934 |
| 1,973,673 | Rice | Sept. 11, 1934 |
| 2,271,764 | Heil | Feb. 3, 1942 |
| 2,305,796 | Seidel | Dec. 22, 1942 |

FOREIGN PATENTS

| | | |
|---|---|---|
| 398,114 | Great Britain | Sept. 17, 1933 |